(12) United States Patent
Cook

(10) Patent No.: US 8,782,105 B1
(45) Date of Patent: *Jul. 15, 2014

(54) FINER GRANTED DATA ORGANIZATION USING DATA SUBLAYERS

(71) Applicant: Symantec Operating Corporation, Mountain View, CA (US)

(72) Inventor: Randall R. Cook, Springville, UT (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/852,107

(22) Filed: Mar. 28, 2013

Related U.S. Application Data

(63) Continuation of application No. 12/059,785, filed on Mar. 31, 2008, now Pat. No. 8,438,196.

(51) Int. Cl.
G06F 7/00 (2006.01)
G06F 17/00 (2006.01)
G06F 17/30 (2006.01)

(52) U.S. Cl.
CPC ............... *G06F 17/30073* (2013.01)
USPC .................. 707/825; 707/829; 707/831

(58) Field of Classification Search
CPC .............................. G06F 17/30073
USPC ....... 707/102; 709/238; 705/14.51; 345/74.1; 717/177
See application file for complete search history.

(56) References Cited

U.S. PATENT DOCUMENTS

| | | | | |
|---|---|---|---|---|
| 6,005,540 A * | 12/1999 | Shinjo et al. | ................. | 345/74.1 |
| 7,013,289 B2 * | 3/2006 | Horn et al. | ................. | 705/14.51 |
| 7,146,429 B2 * | 12/2006 | Michel | ........................ | 709/238 |
| 7,506,338 B2 * | 3/2009 | Alpern et al. | ................. | 717/177 |
| 7,546,319 B1 * | 6/2009 | Srinivasan et al. | ................... | 1/1 |
| 2006/0206511 A1 * | 9/2006 | Picon et al. | ................... | 707/102 |

\* cited by examiner

*Primary Examiner* — Susan Chen
(74) *Attorney, Agent, or Firm* — Campbell Stephenson LLP

(57) ABSTRACT

Disclosed is a method implemented by a computer system that comprises a file system. The file system comprises first, second, third, and fourth directories wherein the first and second directories are sub-directories of the third directory, the third directory is a sub-directory of the fourth directory, the first directory stores only files identified by a first file extension, the second directory stores only files identified by a second file extension, and the first and second file extensions are distinct. In one embodiment, the method comprises receiving first and second requests to open first and second files, respectively, that are contained in the file system. The first and second requests comprise first and second file system paths, respectively. The first file system path comprises a first file name, and the first file name comprises the first file extension. The second file system path comprises a second file name, and the second file name comprises the second file extension. The first file system path is modified by adding identities of the first, third, and fourth directories to the first file system path. The second file system path is modified by adding identities of the second, third, and fourth directories to the second file system path.

14 Claims, 8 Drawing Sheets

Fig. 4A

| File Extension | Redirect Path Component |
|---|---|
| doc | RDR\L2\SL1 |
| jpeg | RDR\L2\SL2 |
| pdf | RDR\L1 |

Fig. 4B

| File Extension | Redirect Path Component |
|---|---|
| pdf | RDR\L1 |

Fig. 4C

| File Extension | Redirect Path Component |
|---|---|
| doc | RDR\L2\SL1 |
| jpeg | RDR\L2\SL2 |
| pdf | RDR\L1 |
| xls | RDR\L3\SL1 |
| ppt | RDR\L3\SL2 |

Patents/L3

| Sub-layer # | Capture Criteria | Redirect Path Component |
|---|---|---|
| 1 | xls | RDR\L3\SL1 |
| 2 | ppt | RDR\L3\SL2 |

Stuff/L2

| Sub-layer # | Capture Criteria | Redirect Path Component |
|---|---|---|
| 1 | doc | RDR\L2\SL1 |
| 2 | jpeg | RDR\L2\SL2 |

Contracts/L1

| Sub-layer # | Capture Criteria | Redirect Path Component |
|---|---|---|
| 1 | pdf | RDR\L1 |

Fig. 8

FINER GRANTED DATA ORGANIZATION USING DATA SUBLAYERS

CROSS-REFERENCE TO RELATED APPLICATIONS

This application is a continuation of U.S. patent application Ser. No. 12/059,785, entitled "Finer Grained Data Organization Using Data Sublayers," filed Mar. 31, 2008 and naming Randall R. Cook as the inventor. This application is assigned to Symantec Operating Corporation, the assignee of the present invention, and is hereby incorporated by reference in its entirety and for all purposes as if completely and fully set forth herein.

BACKGROUND OF THE INVENTION

In computing, a file system is a mechanism for organizing and storing files to make it easy to later find and access them. File systems are typically organized as a hierarchical structure of directories and files in which each directory may contain one or more files and/or underlying directories. A root directory is usually the first or top most directory in the file system hierarchy. It can be likened to the root of a tree—the starting point where all branches originate.

A directory or file's location in the hierarchy of a file system can be represented by a file system pathname (hereinafter path). Paths typically consist of a string of characters signifying directories or filens, separated by delimiting characters, most commonly the slash or the backslash. For example, the path "C:\patents\application.doc" identifies a file named "application.doc" that is stored in a directory named "patents" on the root director of a disk drive represented by "C:." The root directory is represented by the first backslash "\" and the colon ":" is used to determine the mount point/drive. A path can be either absolute or relative. An absolute path is usually written with reference to a root directory. A relative path is written relative to the current working directory, so the absolute path need not be given. The present invention will be described with reference to absolute paths, it being understood that the present invention should not be limited thereto.

Many different formats exist for defining paths of files in file systems, depending on the file system used. The present invention will be described with reference to the Microsoft Windows style of defining paths, it being understood that paths should not be limited thereto. The path "C:\patents\application.doc" noted above is an example of a Windows style path.

Filenames are a special kind of character string used to identify a file stored on the file system. The present invention will be described with reference to filenames containing two parts: the base name (the primary filename) and the extension (e.g., .xls, .exe, .doc, .mpeg, etc.) usually indicating the type of data stored in the file. The extension indicates the content format or type of the file.

A file system is typically managed by software (hereinafter referred to as a file system manager), which is typically part of an operating system. Traditional file system managers offer facilities to create, open, move, rename, delete, etc., both files and directories. The most familiar file systems make use of one or more data storage devices (e.g., disk drives) that offer access to an array of fixed sized blocks of physical memory, generally a power of two in size (512 bytes are common). The file system manager is often responsible for organizing blocks of physical memory into files and directories. File system managers often employ mechanisms (e.g., file allocation tables (FATs)) of some sort for keeping track of which blocks of physical memory belong to which files and which blocks of physical memory are not being used.

Bookkeeping information is also typically associated with each file within a file system. The length of the data contained in a file may be stored as a number of physical memory blocks allocated for the file or as an exact byte count. The time the data file was last modified may be stored as the file's time stamp. Some file systems also store their file creation time, the time it was last accessed, and the time that the file's metadata was last changed. Other information may include the file's device type (e.g., block, character, socket, subdirectory, etc.), its owner user-ID, and/or group-ID, and its access permission settings (e.g., whether the file is read-only, executable, etc.). An executable file, in computer science, is a file whose contents are meant to be interpreted as a program by a computer. Most executable files contain the binary representation of machine instructions of a specific processor or process. Some operating systems designate executable files by a specific naming convention, such as ending a filename with the extension .bin or .exe. The present invention will be described with reference to files that store data, not executable code, it being understood that the present invention should not be limited thereto.

A file system is usually an integral part of any modern operating system. An interface is typically provided by the operating system between a user and the file system. This interface can be textual or graphical, such as provided by a graphical user interface (GUI), such as file browsers. File browsers are useful for speeding up user interaction with files. When displayed in the browser GUI, the files are typically displayed in a graphical representation of the hierarchy.

SUMMARY OF THE INVENTION

Disclosed is a method implemented by a computer system that comprises a file system. The file system comprises first, second, third, and fourth directories wherein the first and second directories are sub-directories of the third directory, the third directory is a sub-directory of the fourth directory, the first directory stores only files identified by a first file extension, the second directory stores only files identified by a second file extension, and the first and second file extensions are distinct. In one embodiment, the method comprises receiving first and second requests to open first and second files, respectively, that are contained in the file system. The first and second requests comprise first and second file system paths, respectively. The first file system path comprises a first file name, and the first file name comprises the first file extension. The second file system path comprises a second file name, and the second file name comprises the second file extension. The first file system path is modified by adding identities of the first, third, and fourth directories to the first file system path. The second file system path is modified by adding identities of the second, third, and fourth directories to the second file system path.

BRIEF DESCRIPTION OF THE DRAWINGS

The present invention may be better understood, and its numerous objects, features, and advantages made apparent to those skilled in the art by referencing the accompanying drawings.

FIGS. 4A-4C illustrate graphical representations of an activation list employed in the computer system of FIG. 1.

FIG. 8 illustrate graphical representations of data structures employed in the computer system of FIG. 1

The use of the same reference symbols in different drawings indicates similar or identical items.

DETAILED DESCRIPTION

The present invention relates to a method and apparatus for organizing files within a file system. The present invention will be described with reference to a file system that uses a single disk drive of a computer system, it being understood that the present invention should not be limited thereto. In the following description, an embodiment of the present invention can be implemented as software executing on a central processing unit or processor of a computer system, although those skilled in the art will readily recognize that the equivalent may be constructed in hardware or a combination of hardware and software. If the invention is implemented as software executing on a processor, the software may be stored as executable instructions in one or more conventional computer readable mediums that may include, for example: magnetic storage media such as a magnetic disk (e.g., a disk drive); optical storage media such as an optical disk; solid state electronic storage devices such as random access memory (RAM), or read-only memory (ROM); or any other device or medium employed to store computer executable instructions.

Figure 1:
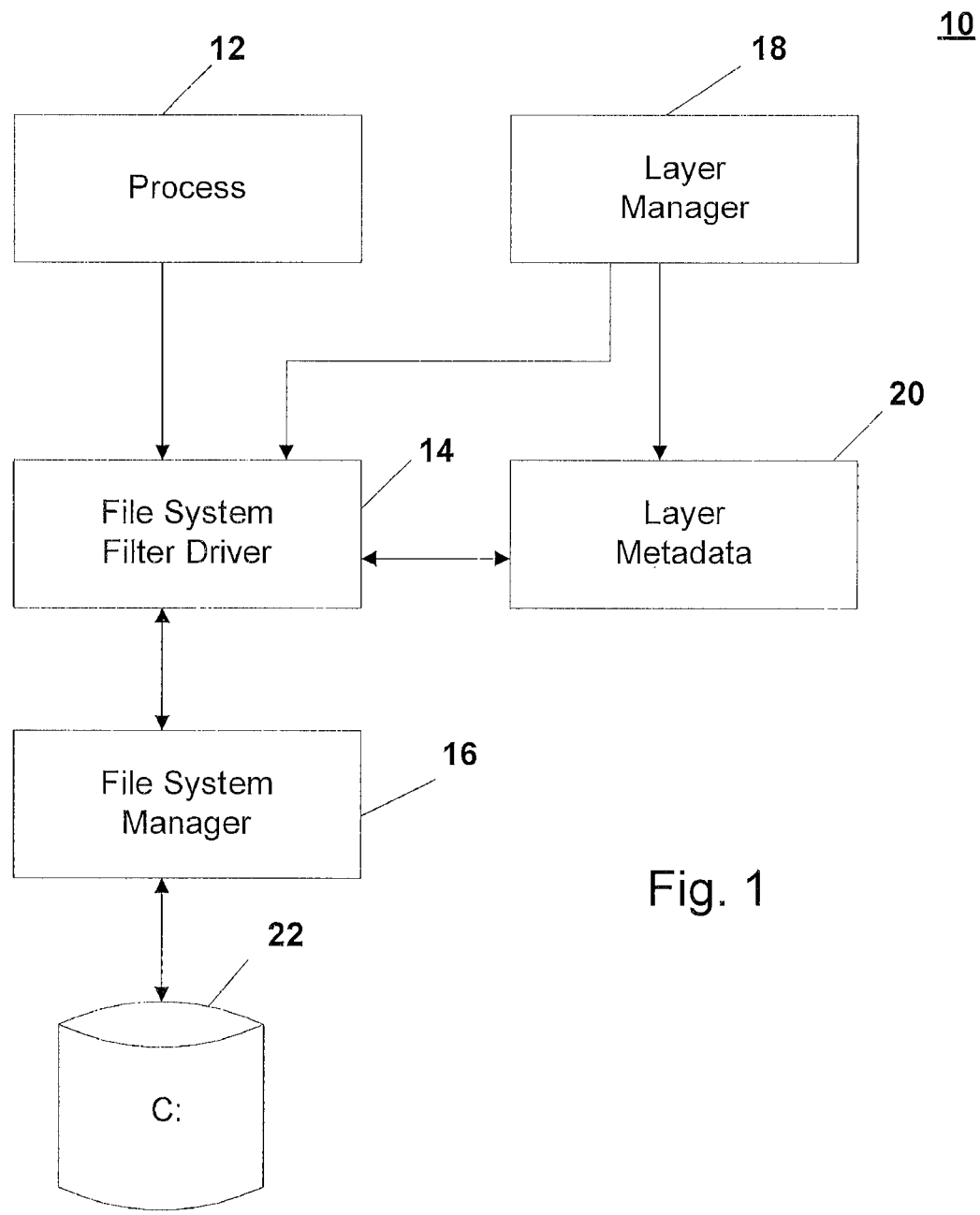
FIG. 1 illustrates a block diagram of relevant components of a computer system.

FIG. 1 illustrates in block diagram form, relevant components of a computer system 10 employing one embodiment of the present invention. The computer system 10 includes components 12-18, each of which may take form in instructions executing on a central processing unit (not shown). Computer system 10 also includes a memory storage device 20 for storing layer metadata (more fully described below) and a disk drive 22 for storing file data. As shown in FIG. 1, a file system filter driver (driver) 14 is coupled between a process 12 and a file system manager 16. Driver 14 is also coupled between a layer manager 18 (which will be more fully described below) and file system manager 16. Lastly, FIG. 1 shows driver 14 in data communication with layer metadata of memory 20. Although FIG. 1 shows several components that are coupled directly together, the term coupled should not be limited thereto. For example, FIG. 1 shows process 12 that is directly coupled to driver 14. Although not shown, intervening components such as an application program interface (API) and an input/output (I/O) manager executing on the CPU, may be coupled in series between process 12 and driver 14.

Figure 2A:
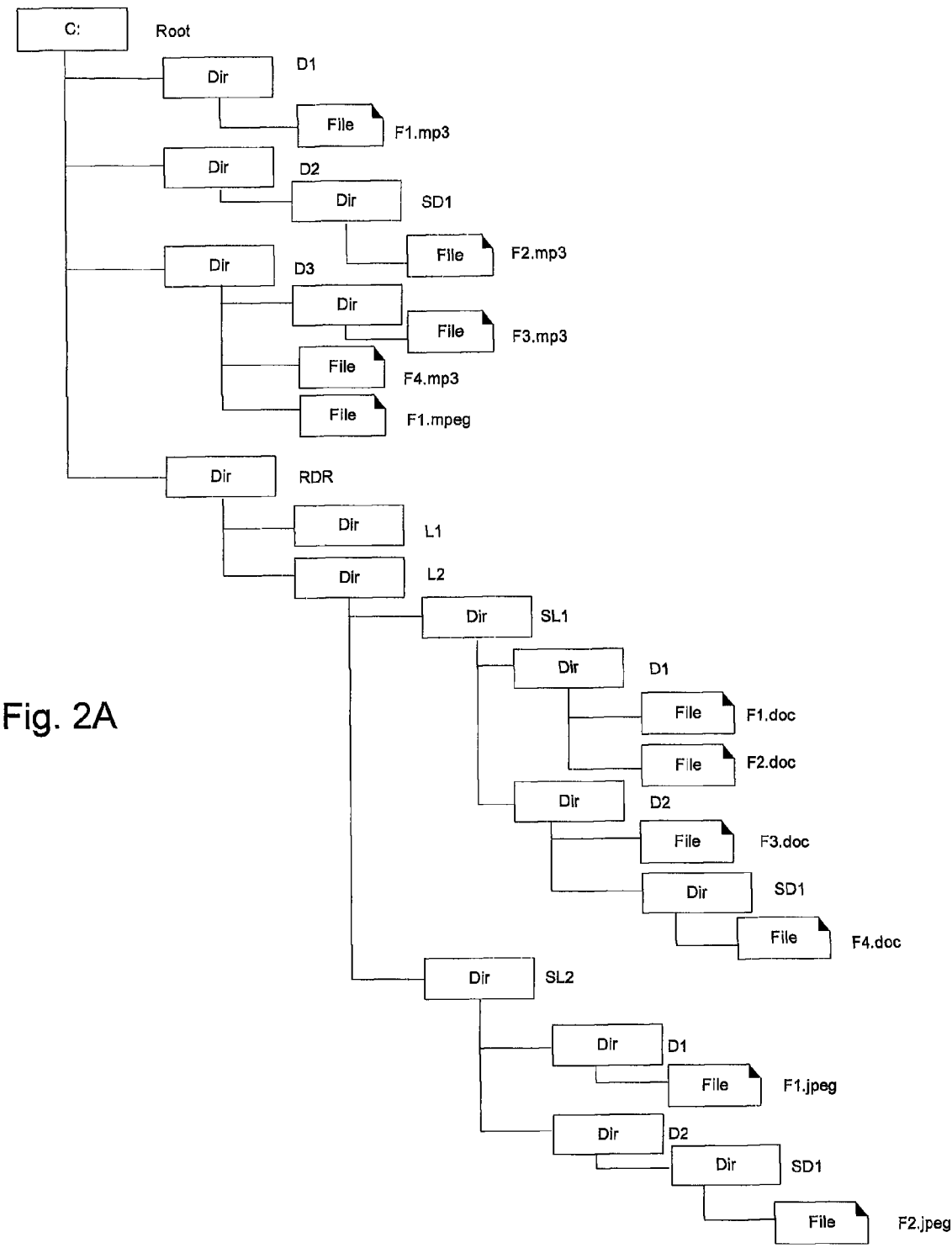
FIG. 2A illustrates a graphical representation of an example file system employed in the computer system of FIG. 1.

File system manager 16 manages a file system. FIG. 2A is a graphical representation of an example file system managed by file system manager 16. The example file system is hierarchical in structure and includes directories and data files. Each directory is identified by a directory name. For example, the file system shown in FIG. 2A includes a directory named RDR, which is a subdirectory of a root directory named "Root." The RDR directory consists of subdirectories "L1" and "L2." As used herein, one directory is a subdirectory of another directory if there are no intervening directories therebetween. For example, directories L1 and L2 in FIG. 2A are subdirectories of directory RDR, and directories SL1 and SL2 are subdirectories of directory L2, but not subdirectories of directory RDR, even though directories SL1 and SL2 are contained within directory RDR. Directories L1 and L2 are also herein referred to as "layers," and directories SL1, and SL2 are also herein referred to as sublayers.

Each file within the file system of FIG. 2A is identified by a filename, which includes a filename extension. For example, directory SD1 stores file F2.mp3, where the ".mp3" extension identifies the type of data (e.g., MP3) stored within this file. Directories SL1 and SL2 (aka, sublayers SL1 and SL2) in FIG. 2A store data files. As will be more fully described below directory SL1 stores only data files having the .doc extension, while directory SL2 only stores the data files having the .jpeg extension. Moreover, it is noted that while the Root directory contains subdirectories D1-D3, none of these subdirectories contain data files with the .doc and .jpeg extensions.

As noted, file systems contain data files, which in turn contain data. While it is said that data files contain data, in reality, the data is stored in physical memory blocks of disk drive 22. File system manager 16 may employ a file allocation table (FAT) which maps logical memory space of the file system to physical blocks within disk drive 22. The FAT enables the file system manager 16 to operate on files contained within the file system in accordance with file system requests that are received from process 12 via driver 14. Example requests include: a file system request to create a new file within the file system; a file system request to open an existing file for subsequent read or write access; a file system request move an existing file from one directory to another directory; a file system request to delete a file from the file system, etc. Each of these requests should include a path of the file of interest. For example, file system manager 16 may receive a request to open file F1.mp3. This request may include "c:\D1\F1.mp3," the path of F1.mp3 within the file system shown in FIG. 2.

As noted above, file system manager 16 receives file system requests via driver 14. In some situations, driver 14 may modify the path contained in the request received from processor 12, before the request is subsequently sent to file system manager 16. In particular, as will be more fully described below, driver 14 may add a "redirect path component" to the path of select file system requests that are received from process 12.

Figure 2B:
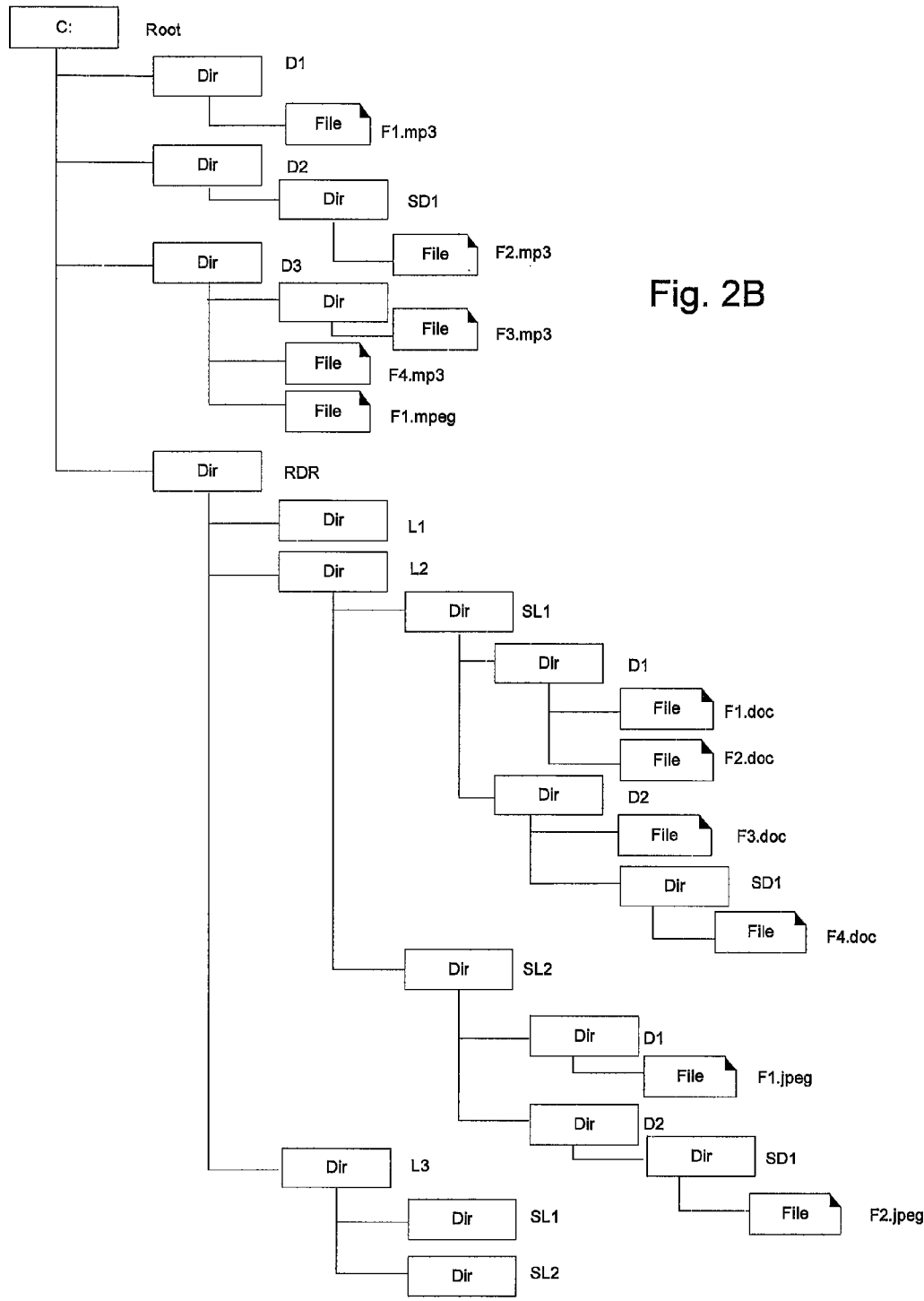
FIG. 2B illustrates the file system of FIG. 2A after modification thereof.
Figure 3:
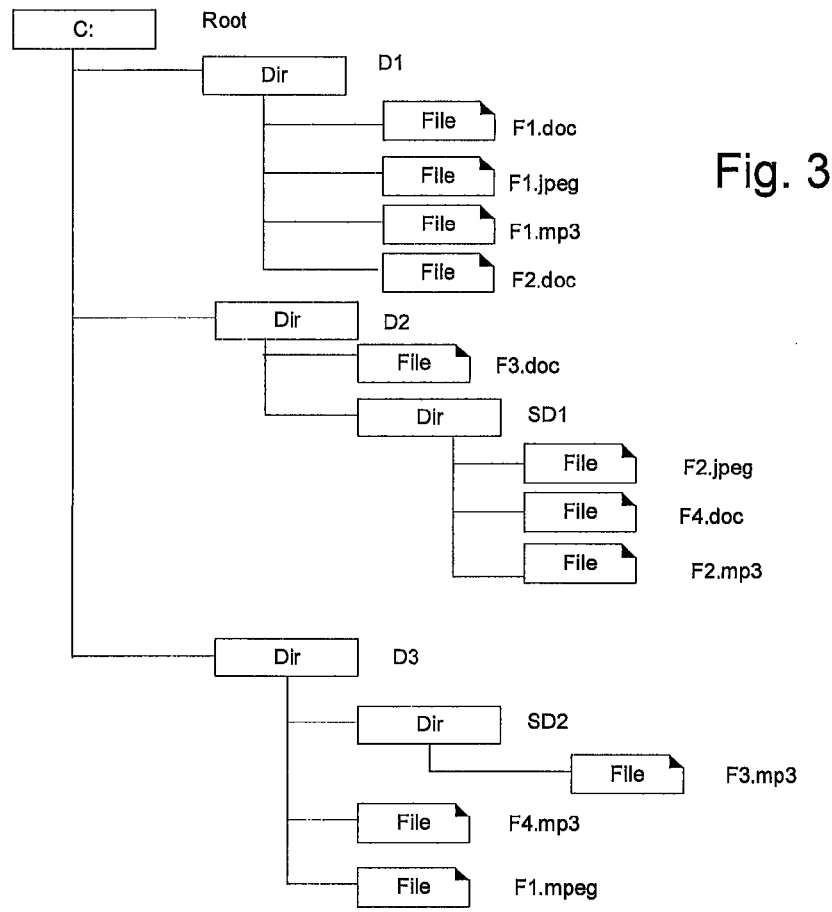
FIG. 3 illustrates a graphical representation of an example virtual file system employed in the computer system of FIG. 1.

While FIG. 2A illustrates an example, graphical representation of the file system managed by file system manager 16, FIG. 3 illustrates an example, graphical representation of the file system as seen by process 12 or as seen by user via a browser GUI (not shown in FIG. 1). The file system shown in FIG. 3 represents a virtualization of the file system shown in FIG. 2. For purposes of explanation, the file system shown in FIG. 3 will be referred to as the "virtual file system."

The virtual file system of FIG. 3 is a hierarchical structure of directories and files. All data files shown in file system of FIG. 2A are likewise shown in virtual file system of FIG. 3. A comparison of the virtual file system shown in FIG. 3 with the file system shown in FIG. 2A, shows that several directory names are commonly used. For example, the "Root" directory shown within the virtual file system of FIG. 3 contains subdirectories "D1-D3." The "Root" directory is also contained in the file system shown in FIG. 2A, and is shown as containing subdirectories "D1-D3." There are differences between the virtual file system of FIG. 3 and the file system of FIG. 2A. For example, the Root directory of the file system shown in FIG. 2A contains subdirectory RDR; however, the Root directory of the virtual file system shown in FIG. 3 does not contain subdirectory RDR. A comparison of the file systems reveals additional differences. For example, directory D1 of the virtual file system contains data files with the .doc and .jpeg extensions. Directory D1 shown in FIG. 2A does not contain files with the .doc and .jpeg extensions. Rather, all files with the .doc and .jpeg extensions are shown to be contained within the RDR directory. In the virtualized file system of FIG. 3, the path location of file F1.doc is C:\D1 \F1.doc. In the file system shown in FIG. 2A, the same file would be located by the path C:\RDR\2\SL1\D1 \F1.doc. As will be more fully described below, the "RDR\2\SL1" is an example of a "redirect path component."

As noted above, driver 14 modifies the file path contained in selected requests that are received from process 12. In one embodiment, driver 14 selects requests for path modification using an activation list more fully described below. FIG. 4A is a graphical representation of an example activation list employed by driver 14. The activation list shown in FIG. 4A can be stored in memory (not shown) accessible by driver 14. The creation of the exemplary activation list will be more fully described below with reference to layer manager 18 and layer metadata 20.

Figure 5:
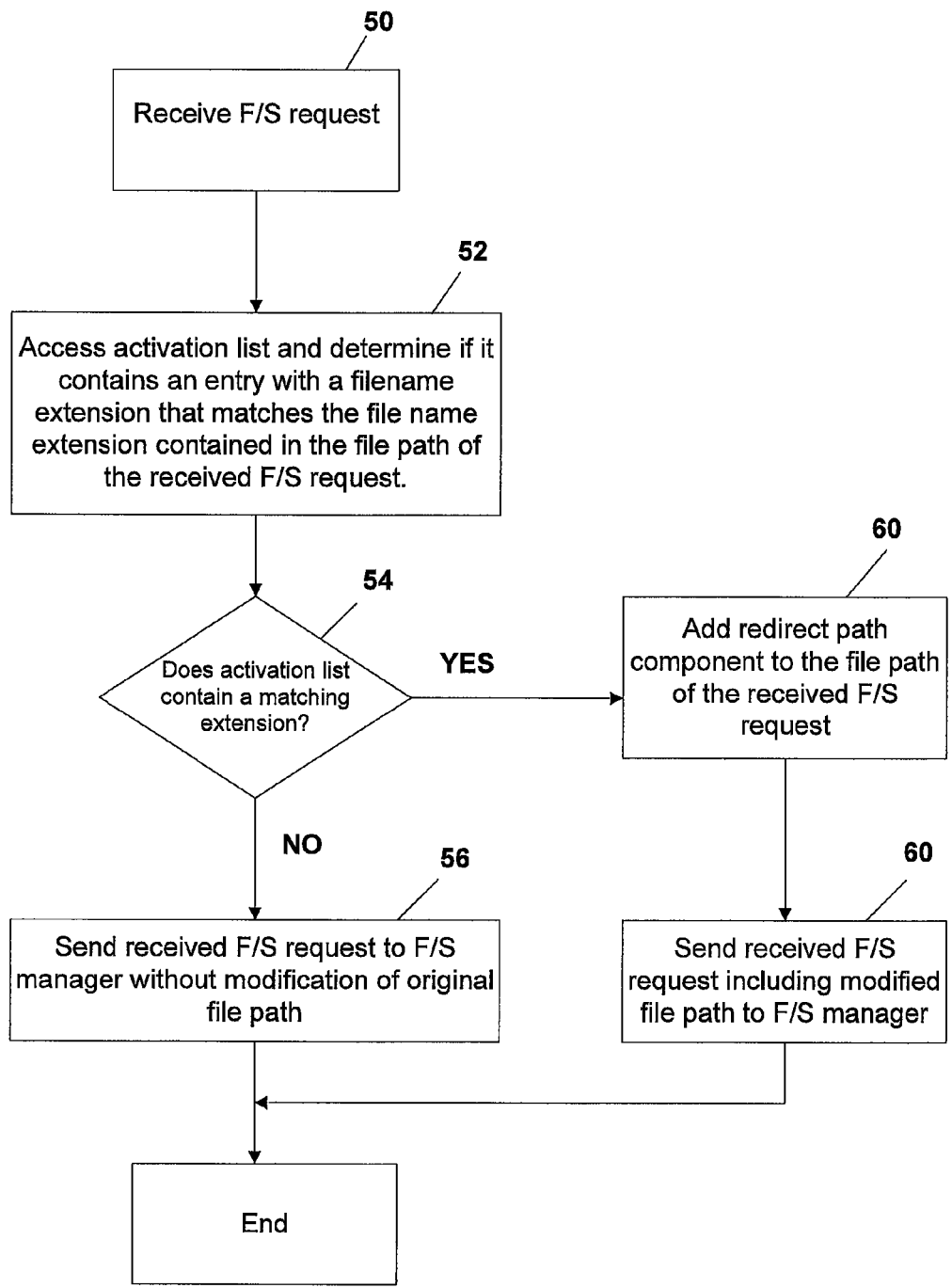
FIG. 5 illustrates relevant components of a process implemented in the computer system of FIG. 1.

Driver 14 uses the activation list shown in FIG. 4A to determine which file system requests from process 12 should be modified before being sent to file system manager 16. FIG. 5 illustrates relevant aspects of the process employed by driver 14 for making this determination. The process of FIG. 5 initiates in step 50 when driver 14 receives a file system request to open a file from process 12. For example, driver 14 may receive a file system request to open existing file "F1.doc" within the virtual file system of FIG. 3. Again, it is noted that virtual file system of FIG. 3 is seen by process 12, not the file system shown in FIG. 2A. Because process 12 is presented with a virtual file system, the example open file request from process 12 will include the file path "C:\D1 \F1.doc." In step 52, driver 14 accesses its activation list (e.g., the activation list shown in FIG. 4A) to determine if the list contains an entry with a filename extension that matches the filename extension that is contained in the file path of the file system request received in step 50. In the example, driver 14 accesses the activation list shown in FIG. 4A to determine if the ".doc" extension of the request to open "C:\D1 \file F1.doc," is contained in the activation list and mapped to a redirect path component. If the activation list does not contain a matching filename extension, then driver 14 sends the file system request to file system manager 16 without modification of the file path as shown in step 56. However, if the activation list contains a matching filename extension, then driver 14 modifies the file path of the received file system request by, in one embodiment, adding the redirect path component that is mapped to the matching filename extension. To illustrate, the example file system request contains the file path C:\D1 \F1.doc. Because the ".doc" extension of this path is contained within the activation list shown in FIG. 4A, driver 14 will add the mapped redirect path component RDR\1\SL1 to the original file path of the request thereby changing the original path to "C:\RDR\1\SL1\D1\F1.doc." Once the original file path of the received file system request is modified, the received file system request, including the modified file path, is sent to file system manager 16 for further processing. To further illustrate the process shown in FIG. 5, presume that driver 14 receives a file system request to delete file F1.mp3, which is contained in directory D1 of the virtual file system shown in FIG. 3. This example file system request should include the file path "C:\D1\F1.mp3." Because the activation list shown in FIG. 4A does not contain an entry with the ".mp3" extension, driver 14 will not modify the original path, and the request will be sent to file system manager 16 for further processing as is.

With continuing reference to FIG. 2, the subdirectories of RDR will be referred to herein as "layers." These layers can be activated or deactivated as will be more fully described below. When a layer is activated, the files contained in the activated layer should appear as being contained in the virtual file system. In contrast, when a layer is deactivated, the files contained in the deactivated layer should not appear as being contained in the virtual file system. The foregoing description of the virtual file system shown in FIG. 3 presumes that all layers of RDR are active.

A user can activate or deactivate a layer using the layer manager 18 shown in FIG. 1. In one embodiment, layer manager 18 can present a layer manager GUI (not shown), which lists all layers by name that are contained within the file system, along with an indication of which layer is active or not. A user can activate or deactivate a layer using the layer manager GUI. In the example embodiment described above, the layer manager GUI when presented by layer manager 18, would identify layers L1 and L2 by name as being activated. As an aside, layers L1 and L2 may be identified in the layer manager GUI by names (e.g., L1 may be identified by "Stuff" and L2 may be identified by "Contracts") that were previously assigned by the user. Importantly, by activating or deactivating a layer (e.g., layer L2), the user activates or deactivates, respectively, all sublayers (e.g., SL1 and SL2) contained in the layer, automatically.

Layer manager 18 can send a deactivation or activation command to driver 14, which includes an identity of the layer to be deactivated or activated, in response to receiving a corresponding command from the user via the layer manager GUI. The layer can be directly or indirectly identified in the command. When indirectly identified (e.g., by a user given name such as "Stuff"), driver 14 may need to access metadata layer 20 in order to identify the layer as it exists in the file system.

In response to receiving a layer deactivation command, driver 14 should remove all entries from the activation list (e.g., the activation list shown in FIG. 4A) that correspond to the identified layer. In one embodiment, each entry that contains a redirect path component, which in turn contains the identified layer, is removed from the activation list. In contrast, driver 14 would add one or more entries to the activation list that correspond to the layer identified in an activation command that is received from the layer manager. Driver 14 may need to access metadata layer 20 in order to identify entries that need to be added to the activation list.

Figure 6:
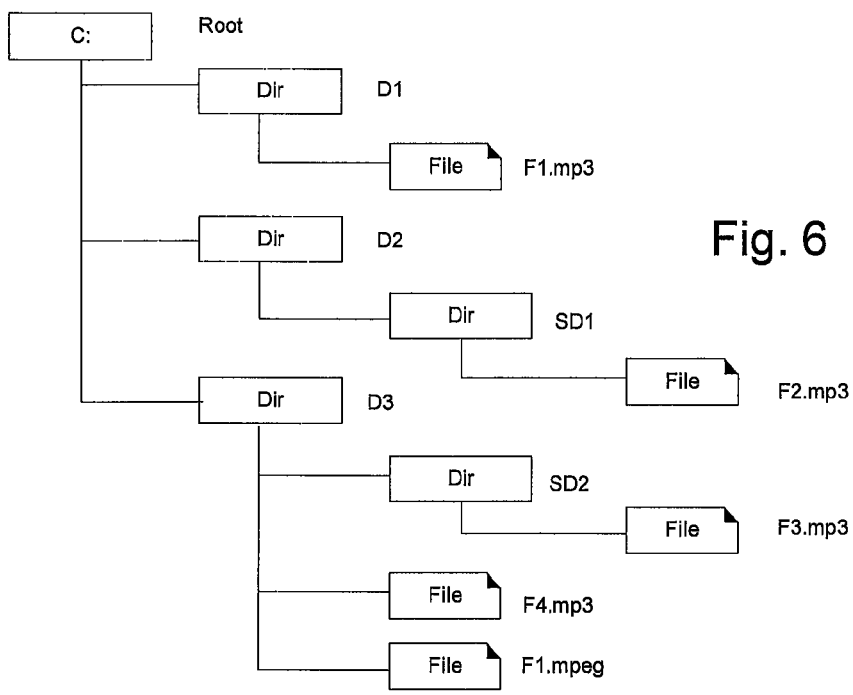
FIG. 6 illustrates the virtual file system of FIG. 2 after modification thereof.

To illustrate, the activation list of FIG. 4A shows that layer L2 is active since the activation list includes a pair of entries that contain redirect path components, which in turn contain "L2," Moreover, FIG. 3 shows that layer L2 is active since the files of layer L2 (i.e., F1.doc, F2.doc, F3.doc, and F4.doc) are also shown as being contained in the virtual file system of FIG. 3. Suppose a user seeks to deactivate layer L2. Layer manager 18, in response to receiving input from the user via the layer manager GUI, generates and sends a command to deactivate layer L2. Driver 14 receives the command and removes activation list entries that contain redirect path component(s) that include the identified layer (e.g., layer L2). FIG. 4B illustrates the activation list shown in FIG. 4A in response to receiving the command from layer manager 18 to deactivate layer L2. In particular, FIG. 4B illustrates the activation list of FIG. 4A with the first two entries removed therefrom. It is noted that these two entries are removed in response to driver 14 receiving a single deactivation command from layer manager 18 to deactivate layer L2. With layer L2 deactivated, driver 14 would no longer modify file system requests having a path that contains the .doc or .jpeg extensions. As an aside, by deactivating layer L2, the virtualized file system presented to process 12 or to a user via a browser GUI, would also be modified. FIG. 6 illustrates the virtualized file system of FIG. 3 after deactivation of layer L2.

Layer manager 18 can generate a single command to activate or reactivate layer L2, which is subsequently sent to driver 14. In response to receiving this command, which includes an identification of the layer (e.g., L2) to be activated, driver 14 may access layer metadata 20 using the identification. Layer metadata 20 may include data structures, each one of which corresponds to an active or deactivate layer. Driver 14 accesses layer metadata 20 with the identity of layer (e.g., L2) to be activated or reactivated. The data structure corresponding to layer L2 should identify all filename extension/redirect path component pairs to be added as separate entries to the activation list. If a user reactivates layer L2 via layer manager 18, the activation list would return to the state shown in FIG. 4A.

The foregoing describes a process in which a user can activate or deactivate a layer, which in turn contains sublayers, each of which is directed to storing data files of a particular extension. This process provides a more efficient mechanism for managing multiple sublayers. Layer manager 18 can be used to generate the single commands to efficiently perform other actions on sublayers, including the ability to copy a group of sublayers to another computer system using a single input command.

Figure 7A:
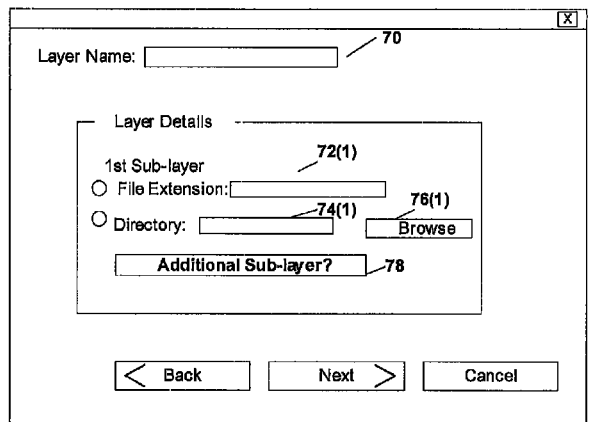
FIGS. 7A and 7B illustrate graphical representations of a user interface employed in the computer system of Figure.

As noted above, layer manager 18 enables a user to create new layers within the RDR directory show in FIG. 2. FIG. 7A illustrates a graphical representation of an example interface that is provided by layer manager 18 for enabling a user to create a new layer within the RDR directory. This interface includes several fields into which a user can enter information for defining the new layer and one or more sublayers thereof. The user can enter the name of the layer in field 70. The user can enter a "capture criteria" into field 72(1) or 74(1), but not both, for a sublayer. Capture criteria defines an aspect of files that are or will be stored in a sublayer. For example, the capture criteria specified for sublayer SL1 in FIG. 2A is file extension ".doc," which means that sublayer SL1 captures and stores all files that have the ".doc" extension. Similarly the capture criteria specified for sublayer SL2 is file extension ".jpeg," which means that sublayer SL2 captures and stores all files that have the ".jpeg" extension. In addition to capturing and storing files in a sublayer based on a file extension (e.g., .doc and/or .jpeg), sublayers can be configured to capture and store files of a particular directory in the virtual file system. In other words, the capture criteria for a sublayer can be set to a directory (e.g., "D3") of the virtual file system. With the capture criteria set to a directory name, a sublayer will capture and store all files sent to the named directory of the virtual file system for storage. A button 76(1) is provided on the interface of FIG. 7A that can be used to display, in hierarchical form, the directories of the virtual file system shown in FIG. 3, to enable the user to select one of these directories as the capture criteria for the sublayer. It is noted that the capture criteria can rules based. For example, the capture criteria for a sublayer may be defined as files ending with a certain file extension which are stored in particular directory of the virtual file system (e.g., .jpeg files stored in the D1 directory). The capture criteria could also be defined as all files stored in a particular directory of the virtual file system except for files with a certain file extension and/or files authored by a particular person. With respect to the latter, access to file metadata may be needed to determine the author of files. The capture criteria could be defined to capture all files created during a certain time period, regardless of their file extensions, or all files created during a certain time period and that are stored in a particular directory of the virtual file system. Other rules based capture criteria are contemplated.

Figure 7B:
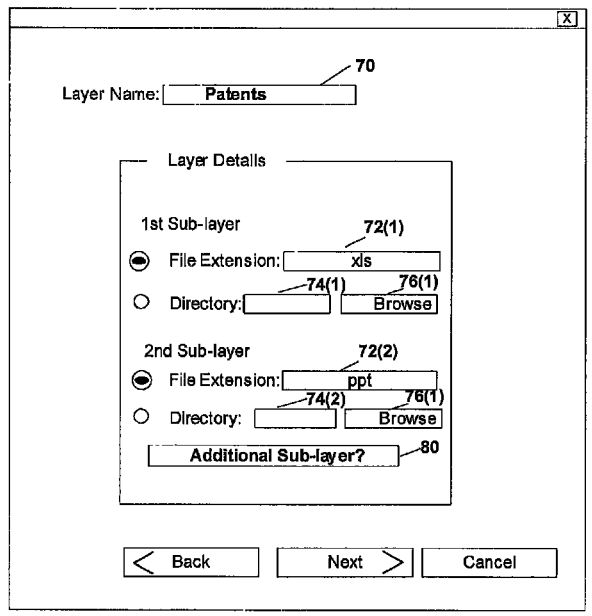

Once the user has specified the first sublayer, the user can specify an additional sublayer by activating additional sublayer button 78. FIG. 7B illustrates the interface shown in FIG. 7A after the user enters information into fields thereof and activates the additional sublayer button 78. Like the interface shown in FIG. 7A, the user can enter the capture criteria for this second sublayer into field 72(2) or 72(4). The user can add further sublayers in the same fashion, i.e., by clicking additional sublayer button 80 and entering the appropriate information.

Once the user has finished defining the new layer and sublayers thereof, layer manager 18 can store the entered information into a newly created data structure within layer metadata 20. FIG. 8 illustrates a graphical representation of data structures stored in layer metadata 20, including the newly created data structure named "Patents," the user given name entered into field 70 of FIG. 7B. Further, a new layer is added to the file system of FIG. 2A. FIG. 2B illustrates the file system shown in FIG. 2A after creation of the new layer (i.e., L3) defined by the information added to the interface of FIG. 7B. No files are initially stored within layer L3. Going forward, any newly created files with the ".xls" and ".ppt" filename extensions, will be captured and stored in sublayers SL1 and SL2, respectively, of activated layer L3 in accordance with the process shown in FIG. 5, even though file system requests generated by process 12 may specify that the newly created files are to be stored in directory D3 of the virtual file system shown in FIG. 3.

The data structures of FIG. 8 contain information relevant to respective layers, which is used by driver 14 when activating or deactivating a layer. For example, the newly created data structure links layer L3 to "Patents," the name assigned to the layer by the user (see FIG. 7B). Each data structure will identify the number of sublayers and their respective capture criteria/redirect path component pairs. For example, the newly created data structure lists two sublayers that capture files with the .xls and .ppt extensions, respectively. The data structures will also list the redirect path components to be added to the activation list (see FIG. 4A) when a layer is activated. For example, if driver 14 receives a command to activate layer L3, in accordance with the process described above driver 14 would access the newly created data structure in layer metadata 20 and retrieve the capture criteria and respective redirect path components contained therein. Driver 14 would then modify the activation list to include two new entries that correspond to the sublayers SL1 and SL2 of layer L3. FIG. 4C illustrates the activation list of FIG. 4A after driver 14 adds the entries for layer L3.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a first request to open a first file that is contained in a file system, wherein
the file system comprises first, second, third, and fourth directories,
the first and second directories are sub-directories of the third directory,
the third directory is a sub-directory of the fourth directory,
the first directory stores only files identified by a first file extension, and
the first request comprises a first file system path, wherein the first file system path comprises a first file name, and wherein the first file name comprises the first file extension;
detecting whether a layer comprising at least one file comprising the first file extension is activated, wherein
the detecting comprises accessing an activation list, and
the layer comprises at least one sub-layer;
modifying the first file system path by adding, to the first file system path, a redirect path component that comprises the identities of the first, third, and fourth directories to the first file system path;
creating the at least one sub-layer, wherein
the creating comprises specifying at least one capture criteria for each of the at least one sub-layer, and
the at least one capture criteria identifies an aspect of items stored in the at least one sub-layer;
updating the activation list, wherein
the updating comprises adding at least one entry for the each of the at least one sub-layer to the activation list; and
rendering items included in the layer and the at least one sub-layer accessible via a virtual file system.

2. The method of claim 1, wherein
each entry of the at least one entry comprises a redirect path component.

3. The method of claim 1, further comprising:
updating the activation list further comprises accessing a data structure that includes the redirect path components for the layer and the at least one sub-layer.

4. The method of claim 1, further comprising:
activating the layer in response to the receiving the an activation instruction; and
activating the at least one sub-layer in response to the receiving the activation instruction.

5. The method of claim 1, further comprising:
creating the layer; and
rendering the layer accessible via the file system.

6. The method of claim 1, wherein
the capture criteria is rules-based.

7. A non-transitory computer readable storage medium storing program instructions executable to:
receive a first request to open a first file that is contained in a file system, wherein
the file system comprises first, second, third, and fourth directories,
the first and second directories are sub-directories of the third directory,
the third directory is a sub-directory of the fourth directory,
the first directory stores only files identified by a first file extension, and
the first request comprises a first file system path, wherein the first file system path comprises a first file name, and wherein the first file name comprises the first file extension;
detect whether a layer comprising at least one file comprising the first file extension is activated, wherein
detecting whether a layer comprising at least one file comprising the first file extension is activated comprises accessing an activation list, and
the layer comprises at least one sub-layer;
modify the first file system path by adding, to the first file system path, a redirect path component that comprises the identities of the first, third, and fourth directories to the first file system path;
create the at least one sub-layer, wherein
creating the at least one sub-layer comprises specifying at least one capture criteria for each of the at least one sub-layer, and
the at least one capture criteria identifies an aspect of items stored in the at least one sub-layer;
update the activation list, wherein
updating the activation list comprises adding at least one entry for the each of the at least one sub-layer to the activation list; and
render items included in the layer and the at least one sub-layer accessible via a virtual file system.

8. The non-transitory computer readable storage medium of claim 7, wherein
each entry of the at least one entry comprises a redirect path component.

9. The non-transitory computer readable storage medium of claim 7, wherein
updating the activation list further comprises accessing a data structure that includes the redirect path components for the layer and the at least one sub-layer.

10. The non-transitory computer readable storage medium of claim 7, wherein the instructions are further executable to:
activate the layer in response to the receiving an activation instruction; and
activate the at least one sub-layer in response to the receiving the activation instruction.

11. A system comprising:
one or more processors; and
a memory coupled to the one or more processors, wherein the memory stores program instructions executable by the one or more processors to:
receive a first request to open a first file that is contained in a file system, wherein
the file system comprises first, second, third, and fourth directories,
the first and second directories are sub-directories of the third directory,
the third directory is a sub-directory of the fourth directory,
the first directory stores only files identified by a first file extension, and
the first request comprises a first file system path, wherein the first file system path comprises a first file name, and wherein the first file name comprises the first file extension;
detect whether a layer comprising at least one file comprising the first file extension is activated, wherein
detecting whether a layer comprising at least one file comprising the first file extension is activated comprises accessing an activation list, and
the layer comprises at least one sub-layer;

modify the first file system path by adding, to the first file system path, a redirect path component that comprises the identities of the first, third, and fourth directories to the first file system path;

create the at least one sub-layer, wherein
  creating the at least one sub-layer comprises specifying at least one capture criteria for each of the at least one sub-layer, and
  the at least one capture criteria identifies an aspect of items stored in the at least one sub-layer;

update the activation list, wherein
  updating the activation list comprises adding at least one entry for the each of the at least one sub-layer to the activation list; and render items included in the layer and the at least one sub-layer accessible via a virtual file system.

12. The system of claim 11, wherein the instructions are further executable to:
  each entry of the at least one entry comprises a redirect path component.

13. The system of claim 11, wherein
updating the activation list further comprises
  accessing a data structure that includes the redirect path components for the layer and the at least one sub-layer.

14. The system of claim 11, wherein the instructions are further executable to:
  activate the layer in response to the receiving an activation instruction; and
  activate the at least one sub-layer in response to the receiving the activation instruction.

* * * * *